Figure 1:
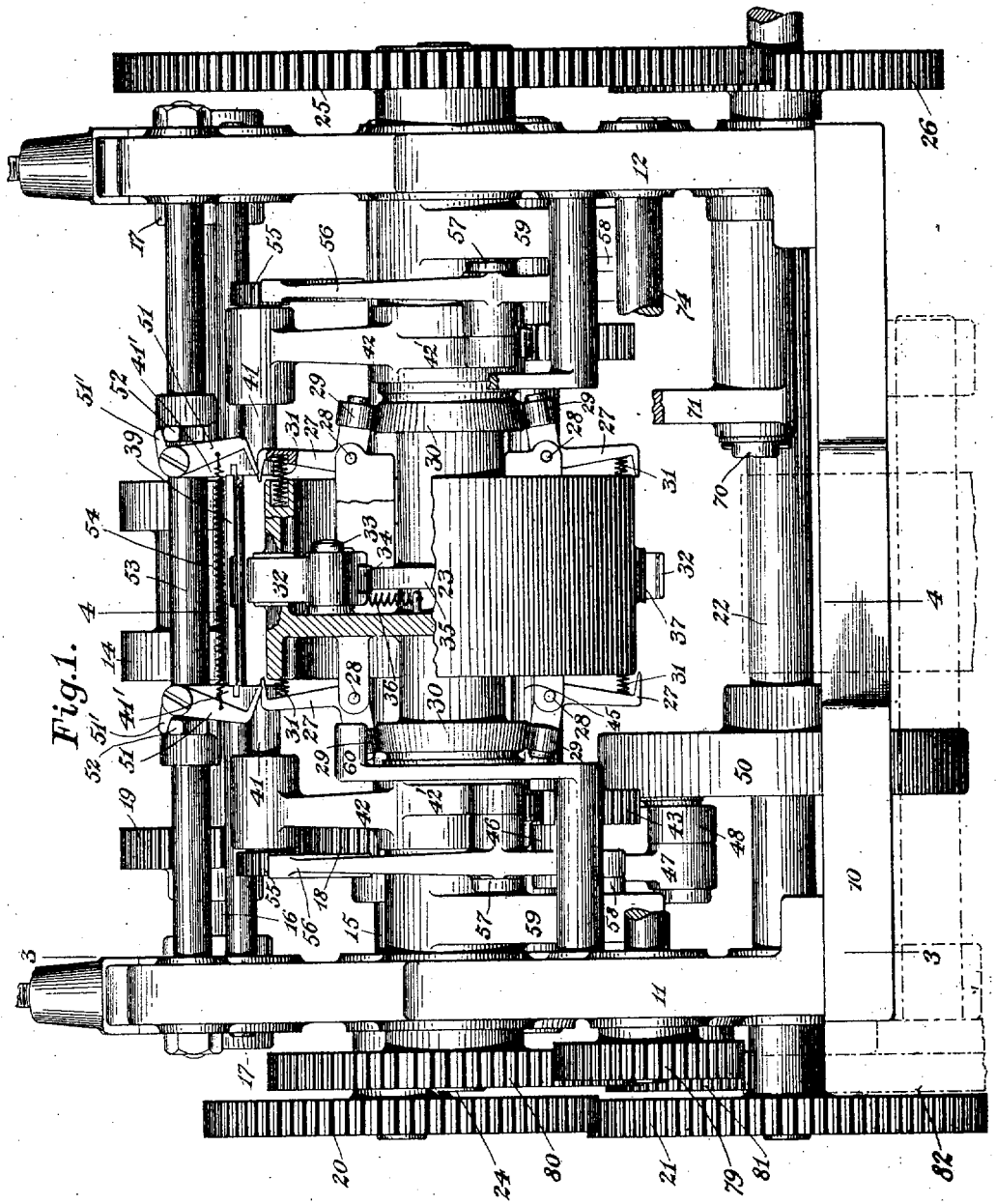

No. 847,193. PATENTED MAR. 12, 1907.
W. A. LORENZ.
PAPER BAG MACHINE.
APPLICATION FILED NOV. 1, 1900.

7 SHEETS—SHEET 1.

Witnesses:
Jas. Dangerfield.
Chas. P. Schmelz

Inventor:
William A. Lorenz

THE NORRIS PETERS CO., WASHINGTON, D. C.

No. 847,193. PATENTED MAR. 12, 1907.
W. A. LORENZ.
PAPER BAG MACHINE.
APPLICATION FILED NOV. 1, 1900.

7 SHEETS—SHEET 2.

Witnesses:
Jas. Dangerfield.
Chas. P. Schultz

Inventor:
William A. Lorenz

No. 847,193. PATENTED MAR. 12, 1907.
W. A. LORENZ.
PAPER BAG MACHINE.
APPLICATION FILED NOV. 1, 1900.

7 SHEETS—SHEET 3.

Witnesses:
Jas. Dangerfield.
Chas. P. Schuely

Inventor:
William A. Lorenz

No. 847,193. PATENTED MAR. 12, 1907.
W. A. LORENZ.
PAPER BAG MACHINE.
APPLICATION FILED NOV. 1, 1900.

7 SHEETS—SHEET 5.

Witnesses:
Jas. Dangerfield
Inventor:
William A. Lorenz

No. 847,193. PATENTED MAR. 12, 1907.
W. A. LORENZ.
PAPER BAG MACHINE.
APPLICATION FILED NOV. 1, 1900.

7 SHEETS—SHEET 7.

Witnesses:
Joseph Merritt.
Nellie Phoenix

Inventor:
William A. Lorenz.

UNITED STATES PATENT OFFICE.

WILLIAM A. LORENZ, OF HARTFORD, CONNECTICUT, ASSIGNOR TO UNION PAPER BAG MACHINE COMPANY, OF PHILADELPHIA, PENNSYLVANIA, A CORPORATION OF PENNSYLVANIA.

PAPER-BAG MACHINE.

No. 847,193.        Specification of Letters Patent.        Patented March 12, 1907.

Application filed November 1, 1900. Serial No. 35,086.

*To all whom it may concern:*

Be it known that I, WILLIAM A. LORENZ, a citizen of the United States, residing at Hartford, in the county of Hartford and State of Connecticut, have invented certain new and useful Improvements in Paper-Bag Machines, of which the following is a full, clear, and exact specification.

This invention relates to paper-bag machines, and particularly to that class thereof wherein square-bottomed bags are formed from tucked or bellows-sided tubing.

The invention comprises what is technically known as the "diamond-folding" section. In this class of machines this section receives the bellows-sided blanks from any suitable blank-forming mechanism, folds the so-called "diamond folds" therein, and then passes the diamond-folded blank on to any desired flap-folding mechanism for completing the bag by pasting and cross-folding the end flaps of the diamond. This intermediate step is well recognized as the most important and difficult step in the commercial manufacture of this form of paper bags because of the intricacy of the folds, the necessity for exactness in the formation thereof, and the high rate of speed at which the operations must be performed in order to permit of commercial success. The conversion of one of these bellows-sided blanks into a diamond-fold blank involves the distention of that end of the blank which is to form the bottom of the bag, one of the flat side walls of the bag being folded backwardly around a primary transverse fold-line which determines the position of the transverse center line of the diamond folds. In distending the bottom end of the blank to this transverse fold-line the side tucks are opened, and the portions of those tucks lying adjacent to the transverse fold-line are transformed into the inner triangular folds, which are well-known characteristics of this form of bag, the portions of these side tucks which extend beyond the outer margins of the said triangular folds being folded inwardly toward each other to form the inner plies of the bottom of the bag, thereby defining those outer margins of the triangular folds. These triangular folds are fundamental characteristics of the bottom fold in this type of bag, and the success of the entire bottom-forming operation depends largely upon the way in which these triangular folds are formed. It is found desirable that precedence should be given to these triangular folds by forming them at an early stage in the diamond-forming operation, and particularly at an early stage in the turning of the upper plies of the blank upon the transverse fold-line, thereby stretching out the tucked sides of the tube and defining the outer corners and margins of the inside triangular folds before the front or flap ends of the blank are distended far enough to throw any inward strain upon the bottom ends of the tucked sides, which inward strain, if it occurred prior to the defining of the triangular folds, would interfere with the proper transformation of those tucked sides into the triangular folds, and thus cause malformations thereof. It is also found desirable to advance the blank-folding member with the blank-support during the diamond-folding operation, so as to carry the defining edge of the blank-folding member forward substantially in register with the transverse fold-line of the blank during the turning movement of the blank-folding member. In this way the blank-folding member and the carrier are maintained in coactive relation through a considerable distance in the travel of the blank, so that more time may be devoted to the operation of folding the complex fold of the diamond than if the axis of the folding member is stationary.

In the present invention these objects are obtained by mounting the blank-folding member for oscillation upon arms which are pivotally mounted to swing in a substantially concentric relation to the curved path of travel of the blank. The blank-folding member is preferably provided with a defining edge for defining the transverse cross-fold line of the upper ply of the blank, and that member is herein placed in eccentric relation to and at one side of its center of oscillation, so that the blank-folding member has a rising-and-falling movement toward and from the surface of the blank-supoprt as it is oscillated in its bearings upon the arms. The swinging arms carry the blank-folding member back and forth over the surface of the blank-support, while the blank-folding member is oscillated in its support in the arms. The blank-folding member is provided with suitable holders for seizing and turning back the upper ply of the blank, the eccentric relation of the blank-folding member to its axis of oscillation enabling the upper ply of the blank to be widely separated from the lower ply during the inward portion of the turning-back movement, so as to stretch out and substantially define the outer margins of the inner triangular folds of the blank at an early stage in the turning movement of the blank-folding member, after which the eccentric movement of the blank-folding member, moving toward the surface of the blank-support, brings the top and bottom plies together, and thus tends to bring the folds more closely together, at least to a sufficient extent to insure their proper flattening.

A further feature of the invention is the arrangement of a blank-supporting surface in a tangential relation to the curved surface of the blank, so that the diamond is formed while that portion of the blank is substantially in a straight condition instead of having the front flap bent downwardly in conformity with the curved surface of the carrier, which curved position would interfere to a considerable degree with the free formation of the diamond folds.

Figure 2:
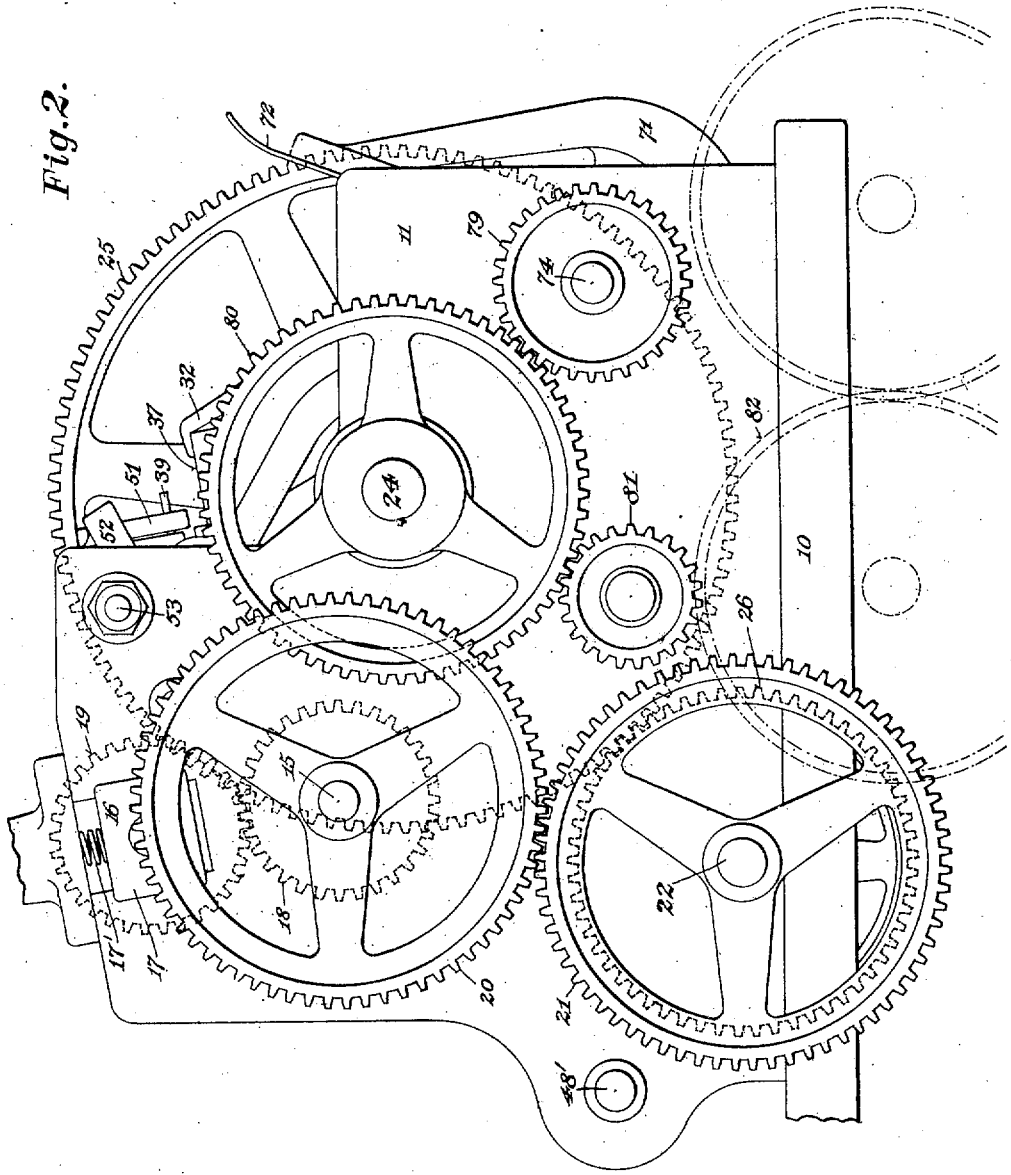
Figure 3:
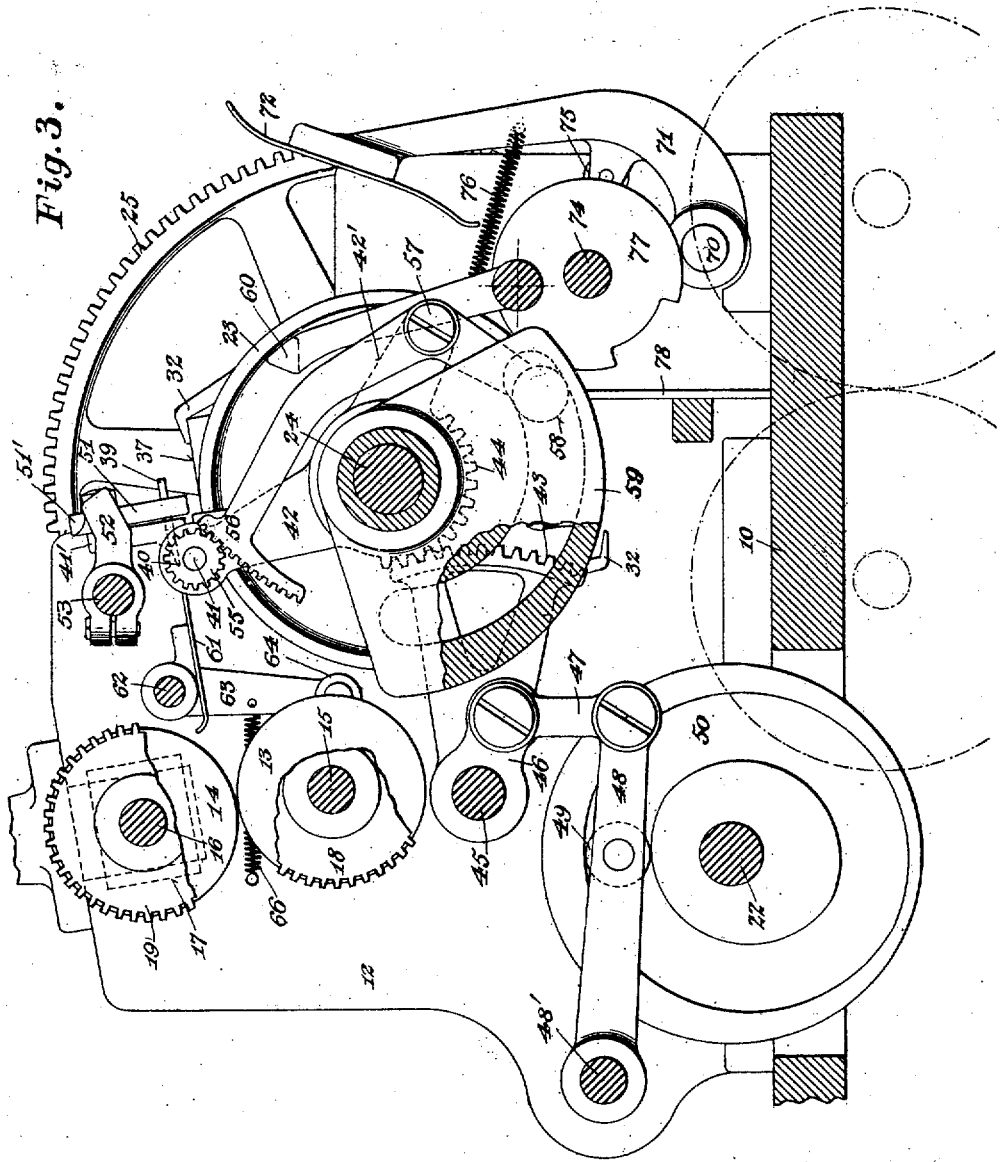
Figure 4:
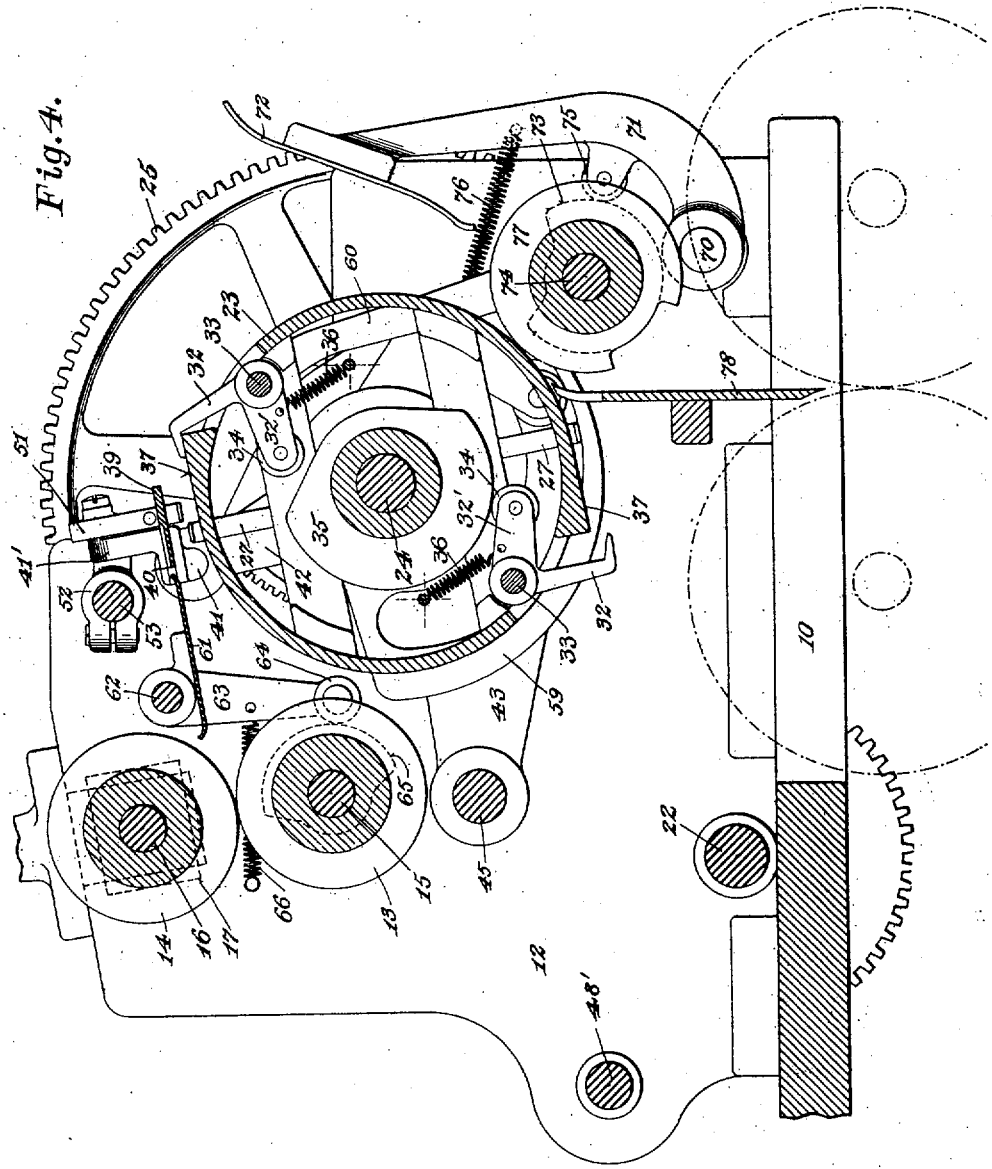
Figure 5:
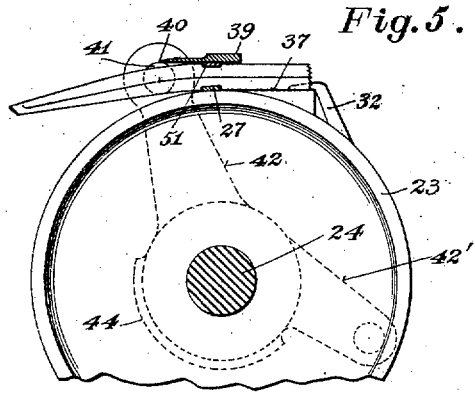
Figure 6:
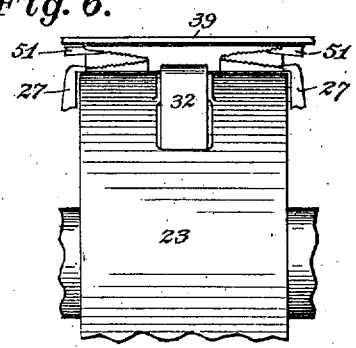
Figure 7:
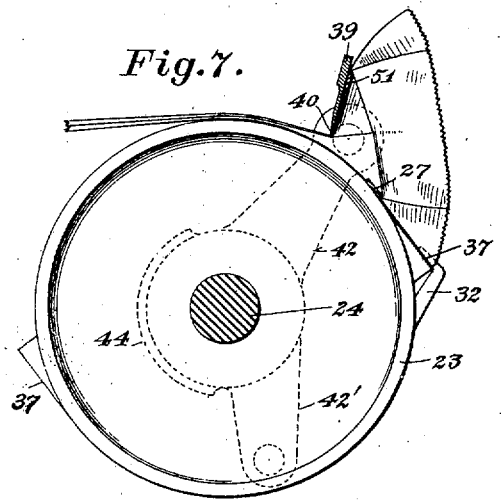
Figure 8:
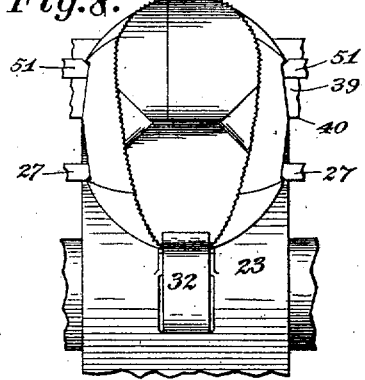
Figure 9:
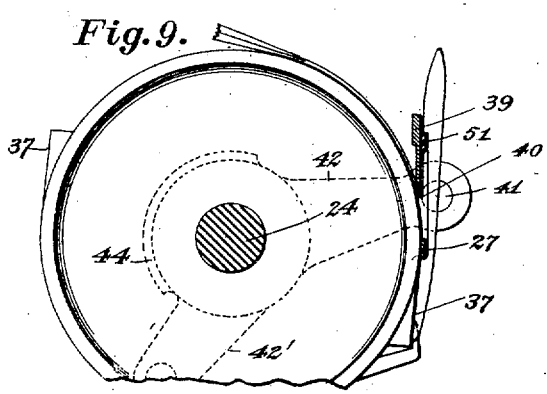
Figure 10:
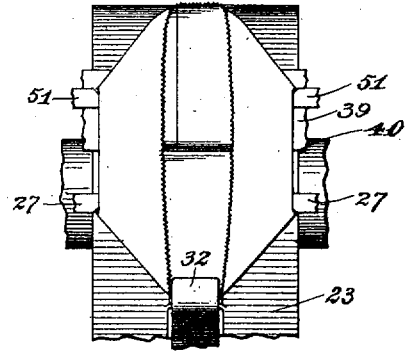
Figure 11:
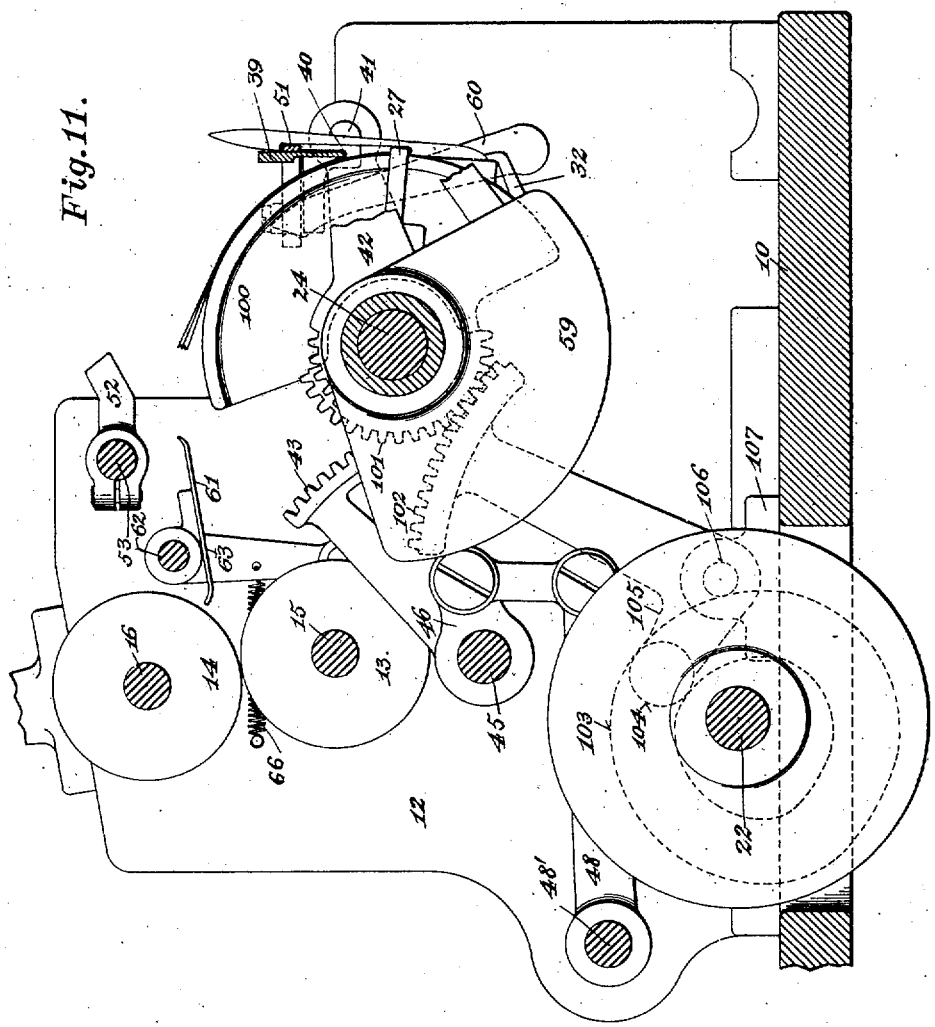
Figure 12:
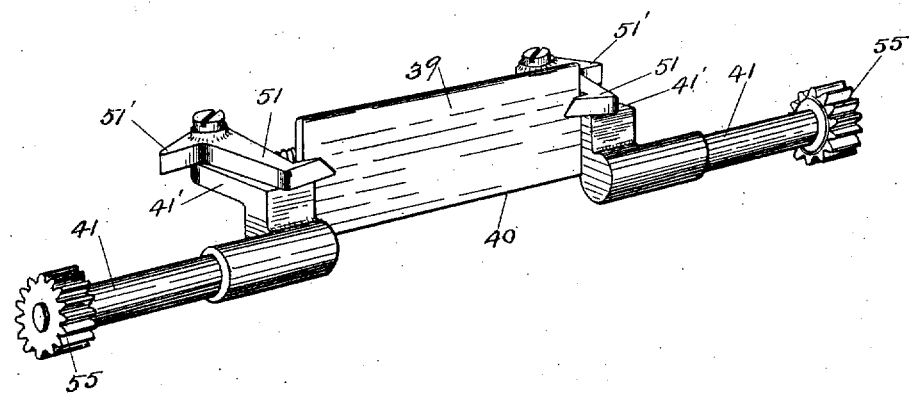
Figure 13:
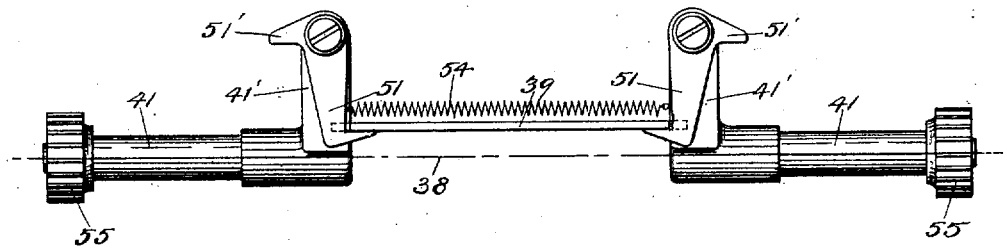

In the accompanying drawings, Figure 1 is a front view of a machine constructed in accordance with my invention. Fig. 2 is a side view thereof looking from the left of Fig. 1. Fig. 3 is a transverse vertical section thereof on line 3 3, Fig. 1. Fig. 4 is a transverse section on line 4 4, Fig. 1. Figs. 5 to 10, inclusive, represent the various stages through which the blank passes while the diamond is being formed, Fig. 5 representing a side view of the blank-carrier, illustrating the manner in which the blank is held thereon and also on the coöperating blank-folding member at their initial starting-point. Fig. 6 is a front view of Fig. 5. Fig. 7 represents the parts in position when the blank has been opened out sufficiently to constitute what is ordinarily called the "box form." Fig. 8 is a front view of the same. Fig. 9 illustrates the parts in the position when the diamond has been substantially completed and the tube collapsed. Fig. 10 is a front view thereof, and Fig. 11 represents a vertical cross-section corresponding to Fig. 3 and illustrating a modification of the carrier and its operating mechanism. Fig. 12 is a perspective view, upon a slightly-increased scale, of the defining-plate and its supporting mechanism. Fig. 13 is a plan view, upon a slightly-enlarged scale, of the defining-plate and its supporting mechanism looking down about vertically in Fig. 7.

In the drawings, 10 designates a bed-plate, to which are secured two upright side frames 11 and 12, in which the several coöperative shafts for driving the various devices are supported. Suitable means are provided for feeding blanks or bellows-sided tubing into the machine, such means consisting in the present instance of suitable feed-rollers 13 and 14, mounted on shafts 15 and 16, respectively, the latter of which is journaled in boxes 17, movably held on the side frames and acted upon by suitable springs 17'. (See Fig. 2.) These feed-rollers are caused to move together by means of gears 18 and 19, mounted on the shafts 15 and 16, respectively, and are driven by a gear 20, mounted on the lower roll-shaft and obtaining motion from a similar gear 21, mounted on a shaft 22, which constitutes the main driving-shaft of the machine and to which power may be applied from any ordinary source. From the feed-rollers the blank or tube is conducted to a suitable carrier upon which the blank is retained during the bottom or diamond forming operation. Connected for coöperation with the carrier is a blank-folding member adapted for engaging the upper ply of the tube or blank, while suitable means are provided for holding the lower ply of the blank in place on the blank-carrier, both carrier and folding member being adapted for coaction to open out the end of the blank and form the diamond, as will hereinafter appear. The carrier is in this instance of the rotary type and comprises, substantially, a cylinder 23, secured upon a shaft 24, which receives rotary movement through a gear 25, secured thereto and in engagement with a gear 26, mounted upon the rear end of the driving-shaft 22, above mentioned. The means for holding the lower ply of the tube on the carrier 23 consist, preferably, of tuck-holders 27, (see Fig. 1,) which are journaled at 28 on the carrier and carry cam-rollers 29, which travel around the periphery of suitable cams 30, causing the tuck-holders to hold the blank on both sides simultaneously and at the proper time, while springs, such as shown at 31, may be employed for releasing the tuck-holders from the blank when permitted to do so by the cams 30. The carrier 23 is also provided with a device for gripping or for holding the front end of the lower ply of the tube or blank, this device being shown herein as a front diamond-holder 32, journaled on a stud 33, which is secured in the web of the carrier 23. The arm 32' of the front diamond-holder 32 carries a roll 34 in engagement with a suitable cam 35, whereby as the carrier rotates said holder 32 will be caused to release the blank at a certain time, while a spring 36 may be employed for closing said holder over the lower ply of the blank.

As above mentioned, my invention comprises a carrier having a blank-supporting surface which is tangentially disposed relatively to the curved surface of the blank-carrier and whereby the front flap of the blank is held in such a manner that the diamond may be formed while the tube is substantially in a straight condition. This tangential blank-supporting surface is designated in the accompanying drawings by 37 and is so formed that all excess or undue strain which would naturally be brought to bear on the blank if resting against the curved surface of the carrier will be avoided. In this manner the lower ply of the blank will be held substantially tangential with the carrier-surface and at a point where the tuck-holders engage the blank.

The blank-folding member, which, as has before been stated, is connected for coöperation with the blank-support, consists, preferably, of a plate, one edge of which constitutes a bottom-defining edge and which is mounted for partial revolution and reciprocation relative to the blank-support.

Inasmuch as the organization of the blank-folding member and its operating mechanism relative to the blank-carrier should be such that the sides of the blank are maintained in a substantially distended condition while the open end of the tucked tube is opened out to form the diamond, I preferably employ a plate 39, having a defining edge 40 so disposed that as the plate or folding member 39 is revolved around its axis of support said edge will be swung in an arc around said axis and thus gradually approach the carrier during the diamond-forming operation and near the end thereof. The plate 40 is during the blank-receiving period disposed substantially in parallelism with the blank, and the defining edge is at its greatest distance from the blank-supporting surface of the carrier, while the distance from said edge to the pivot-axis of support is about equal to that from the carrier-surface to said axis, so that when the plate 40 has completed its movement to the position shown in Fig. 9 said edge will be adjacent the carrier-surface, and thus bring the sides of the blank together. The blank-folding member 39 is in this instance pivotally supported on trunnions 41 in a carrier comprising a pair of arms 42, which are loosely pivoted concentrically with the blank-carrier shaft 24 and which are caused to move in unison by a pair of sectors 43, engaging peripheral gear-teeth 44 on said arms 42, the sectors 43 being secured to a shaft 45. One of the sectors 43 may carry an arm 46, the outer end of which is connected by means of a link 47 with the free end of a lever 48, pivoted at 48' and carrying a cam-roller 49 in engagement with a suitable cam 50, which is mounted upon the above-mentioned shaft 22. From the foregoing it will be understood that the arms 42 are moved in unison by the cam 50 to guides the plate-supporting trunnions 41 in such a manner that the defining edge 40 may be caused to travel in unison with the blank-carrier 23, while at the same time the blank-folding member 39 as a whole, and more particularly the defining edge 40, is caused to partially revolve around the pivot-support of said member from the position shown in Figs. 3, 4, and 5 to that illustrated in Fig. 9.

The center of the shaft or trunnion 41 (shown by dotted circles in Figs. 5, 7, and 9) is the axis of swing of the blade 39, being at one side of the plane of the blade adjacent and substantially opposite to the defining edge 40 thereof.

In Fig. 5 the parts are shown in the blank-receiving position, the blade 39 lying in a tangential relation to the blank-carrier, with its defining edge 40 at approximately its greatest distance from the blank-support. At the position shown in Fig. 7 the blade 39 is swung about ninety degrees to a position substantially perpendicular to the surface of the blank-support. At the position shown in Fig. 9 the blade 39 is swung approximately ninety degrees farther and again lies in a tangential relation to the blank-support, but reversed from that of Fig. 5. In passing from the position of Fig. 5 to that of Fig. 7 the defining edge 41 swings backwardly relative to the arms 42 and downwardly toward the blank-support. In passing thence to the position of Fig. 9 the defining edge continues its downward swing toward the blank-support and forwardly relative to the arms 42. In order to maintain the blade 39, and particularly the defining edge 40 thereof, in operative relation and register with the blank, the forward travel of the arms 42 relative to that of the blank-support is accelerated until the position of Fig. 7 is reached, and then retarded until the position of Fig. 9 is reached, as may be observed by comparing the relative positions of the defining edge and the trunnions 41 in the three views. At the position shown in Fig. 7 the tucked sides are distended far enough to safely develop the inside triangular folds, as shown in Fig. 8, after which the bottom end portions of the blank beyond those folds may be safely flattened down into the truncated diamond form, (shown in Figs. 9 and 10,) the elevation of the front flap above the curved surface of the blank-support facilitating the natural and easy formation of the folds.

Means are provided for holding the upper ply of the blank on the folding member, these means consisting, in the present instance, of box-holders 51, pivoted in extensions 41' of the trunnions 41 and having tailpieces 51' to be engaged for opening the holders at the blank-receiving end of the stroke by abutments 52, which may be secured to a fixed shaft or bar 53, held in the side frames of the machine. The box-holders may be operated to close against the plate 39 by a suitable spring 54, connected to both holders.

Figs. 12 and 13 clearly show the relative position of the defining-plate 39 and its supporting-trunnions 41 and the extensions 41', upon which the box-holders 51 are pivoted and upon which the trunnions 41 and pinions 55 are shown. The edge 40 of the defining-plate 39 is set at a tangent to the axis of the trunnions 41, this axis being shown by the dotted line 38 running through the center of the trunnions 41 and illustrated in Fig. 13.

The folding mechanism or devices, supported on the trunnions 41, is swung about the axis of said trunnions by means consisting in the preferred form shown of pinions 55, mounted on the trunnions, which are engaged by sectors, affixed to or forming parts of the arms 42 above mentioned. The sectors 56 carry cam-rollers 58, in engagement with preferably stationary cams 59, so that as the carrier of the folding member is oscillated in the manner above described proper movement will be imparted to the blank-folding member around its support-axis on said carrier. When the carrier has been advanced with the rotary blank-support until the diamond has been substantially completed, the box-holders are again released from the blank by abutments 60, secured to the side frames 11 and 12, respectively.

Interposed between the feed-rolls 13 14 and the carrier 23 is a guide-plate 61, whereby the blank as it is fed forward by said rolls will be guided with its front end into position between the folding member and the blank-carrier, and in order to permit such blank to avoid the end of the folding member as it returns to its blank-receiving position the guide-plate 61 may be movably supported on a shaft 62, receiving rocking movement through a lever 63 and a roll 64, in engagement with a cam 65, which may be mounted upon the shaft 15 of the lower feed-roll 13, a spring 66 serving to keep said roller in engagement with the cam 65.

Secured to the side frames 12 is a stud 70, on which is journaled a lever 71, carrying at one end a drop-plate 72, adapted to coöperate with the blank-carrier 23 in flattening and completing the diamond. The lever 71 may be actuated by a cam 73, secured to a shaft 74 and engaging a roller 75, journaled on the lever 71, while a spring 76 may be employed to force the drop-plate 72 against the diamond. After the diamond has been flattened by the drop-plate the blank may be carried into contact with a presser-roll 77, mounted upon the shaft 74, after which a delivery-plate 78 may deflect the blank from the carrier and conduct the same to other devices, which may include pasting and flap-folding rollers, whereby the blank is transformed into a completed bag. Proper rotary movement may be imparted to the shaft 74 by a pinion 79, secured to said shaft and in engagement with a gear 80, mounted upon the carrier-shaft 24, and also in engagement with an intermediate 81, which in turn is in mesh with a gear 82 (shown in dot-and-dash line in Figs. 1 and 2) for driving the flap-folding devices above referred to.

The operation of my improved machine is as follows: Bellows-sided or tucked tubing is introduced into the machine by the feed-rolls 13 14 and guided by the guide-plate 61 into position between the blank-folding member 39 and the blank-carrier 23 in such a manner that the tuck-holders 27 and the front diamond-holder 32 will engage the lower ply of the blank, as shown in Figs. 5 and 6, at which time the front edges of both tuck-holders and box-holders are in alinement with each other, whereupon both the blank-support and the defining edge of the blank-folding member will move forward during the formation of the diamond. In Figs. 7 and 8 the end of the tube is shown opened out into what is generally known as the "box form," clearly illustrating the manner of forming the inside triangular folds, and in Figs 9 and 10 the blank-folding member is shown as having arrived at the end of its stroke, showing the diamond substantially completed and in condition when acted upon by the drop-plate. The box-holders are then disengaged from the blank and the blank-folding member will return to its blank-receiving position, while the blank is drawn forward and brought into contact with the presser-roll, whereupon the front diamond-holder 32 and the tuck-holders 27 release the blank, which is then carried into contact with various other devices, whereby the bag is completed.

It is evident that many changes may be made in the particular construction of some of the elements of my improved machine without departing from the gist of my invention. While I have shown and described my improved blank-folding member and also its operating mechanism in combination with a rotary blank-carrier, it should be understood that other forms of carrier or blank-support may be substituted therefor, and in Fig. 11 of the drawings I have shown a modification of my improved machine, which in this instance includes an oscillatory carrier instead of a rotary device, as above described. Here the carrier 100 is provided with gear-teeth 101, in engagement with a sector 102, to which proper movement may be imparted by a cam 103, engaging a cam-roller journaled on the arm 105 of the sector 102, the latter being pivoted at 106 on a bracket 107, which may be secured to the bed-plate of the machine. While in this instance the carrier has an oscillatory movement imparted to it by the cam-operated sector 102, the movement of the blank-folding member 49 is the same as hereinbefore described.

Certain novel features of invention relating to bag-machines shown and described but not claimed herein are shown, described, and claimed in my copending applications, Serial No. 27,864, filed August 23, 1900, and Serial No. 32,123, filed October 5, 1900. In so far as the present application shows features of novelty in common with my above-enumerated prior applications it is to be regarded as subordinate to them.

Having described my invention, what I claim as new, and desire to secure by Letters Patent, is—

1. In a bag-machine, mechanism for forming diamond folds on a bellows-sided bag-blank having in combination a folding-bed mounted to turn about an axis, a carrier, means for oscillating the carrier about a center of oscillation situated within the path of movement of the bed, means for engaging and turning back the upper ply of the bag-blank moved by said carrier through an oscillatory path above the rotary path of the bed, said turning-back means including a folding member mounted for oscillation relative to said carrier about an axis at one side of said member.

2. In a bag-machine, mechanism for forming diamond folds on a bellows-sided bag-blank, including in combination a rotary folding-bed, arms pivoted to turn about an axis within the rotary path of the bed, means for engaging and turning back the upper ply of the bag-blank pivotally supported by said arms to turn relative thereto about an axis, and means for oscillating said arms about their axis to carry the turning-back means through an oscillatory path above the rotary path of the bed, said turning-back means including a folding member disposed at one side of the axis of its movement relative to said arms.

3. In a bag-machine, mechanism for forming diamond folds on a bellows-sided bag-blank, including in combination a folding-bed mounted to turn about an axis to carry a blank through a curved path, carrier-arms pivoted to turn about an axis substantially coincident with the first-named axis, means for engaging and turning back the upper ply of the bag-blank, pivotally connected to said arms, and means for oscillating said arms on their pivotal axis to carry the turning-back means through an oscillatory path above the curved path of the blank, said turning-back means including a folding member disposed at one side of its pivotal connection to said arms.

4. In a bag-machine, mechanism for forming diamond folds on bellows-sided blanks including in combination a folding-bed turning about an axis to carry a blank through a curved path, carrier-arms pivoted to turn about an axis approximately coincident with the first-named axis, folding mechanism carried by said arms, means for oscillating said arms to carry said folding mechanism through an oscillatory path above said curved path, said folding mechanism including a folding member pivoted to said arms to turn relative thereto on an axis situated a substantial distance above said curved path, said folding member being disposed at one side of its axis of movement relative to said arms a distance approximately equal to the distance of that axis above said curved path, and means for oscillating said folding member on the arms as the latter are oscillated about their axis.

5. In a bag-machine, mechanism for forming diamond folds on bellows-sided blanks, including in combination a folding-bed pivoted to turn about an axis to carry a blank through a curved path, carrier-arms pivoted to turn about an axis substantially coincident with the first-named axis, folding mechanism supported by said arms, and means for oscillating said arms about their pivot-axis, said mechanism including a folding member having a fold-defining edge, and being pivoted to said arms to turn about an axis laterally displaced from said fold-defining edge, said folding member extending substantially at right angles to the plane including said defining edge and said last-mentioned axis.

6. In a bag-machine, mechanism for forming diamond folds on bellows-sided blanks, including in combination a folding-bed, means for turning it about an axis to carry a blank through a curved path, carrier-arms pivoted to turn about an axis substantially coincident with the first-mentioned axis, means for oscillating said carrier-arms, folding mechanism moved by the oscillation of said carrier-arms through an oscillatory path above the curved path of the blank, said folding mechanism including a folding member pivotally supported on said arms to turn about an axis disposed at one side of the blank-folding member, and means for oscillating said member upon the arms as the latter are oscillated about their axis.

7. In a bag-machine, mechanism for forming diamond folds on bellows-sided blanks including in combination, a folding-bed rotating about an axis, carrier-arms mounted for oscillation at opposite sides of the folding-bed about an axis located within the rotary path of the bed, and folding mechanism carried by said arms, including a blank-folding member having a fold-defining edge, said folding mechanism being pivoted to said arms to turn relatively thereto about an axis displaced from said edge, the folding member extending transversely to the plane including said edge and said last-mentioned axis.

8. The combination with a traveling blank-support and means for securing a bag-blank thereon, of a blank-folding member having a defining edge, means for supporting said member for oscillatory movement upon an axis at one side of the plane of the folding member, means for swinging said member upon its axis during the folding operation, and means for advancing said axis with the blank-support during the folding operation at a rate to carry the fold-defining edge at approximately the same speed as that of the movement of the blank.

9. The combination with a traveling blank-support and means for securing a bag-blank thereon, of a blank-folding member having a defining edge, means for supporting said member for oscillation upon an axis which is at one side of the blank-folding member, means for swinging the folding member on its axis during the folding operation to carry the defining edge toward and away from the surface of the blank-support, and means for advancing said axis with the blank-support to carry the fold-defining edge at approximately the same speed as the blank carried by said support.

10. The combination with a rotating blank-support and means for securing a bag-blank thereon, of a blank-folding member having a defining edge and provided with trunnions, the axis of said trunnions being at one side of the defining edge, a pair of arms mounted to swing about an axis coincident with the axis of rotation of the blank-support, said arms having said trunnions journaled in them, means for oscillating said arms about their axis, and means for oscillating the blank-folding member relatively to the arms.

11. The combination with a blank-support rotating about an axis and means for securing a bag-blank thereon, of a blank-folding member having a defining edge and provided with trunnions, the axis of which is at one side of the plane of the folding member, arms mounted to swing about an axis located within the rotary path of the blank-support and pivotally supporting said trunnions, means for oscillating the blank-folding member on said arms, and means for oscillating said arms to carry the defining edge of the blank-supporting member at approximately the same angular velocity as the blank-support.

12. In a bag-machine, mechanism for forming diamond folds on bellows-sided bag-blanks, including in combination a rotating shaft, a blank-support secured thereto, a carrier journaled about said shaft, means for engaging and turning back the upper ply of the blank, supported by said carrier to turn relatively thereto about an axis, said means including a gear concentric with said axis, a stationary cam mounted upon and positioned by said shaft, and a lever pivoted to the carrier having a portion engaging said cam and having a gear-segment which meshes with said gear, a second shaft, gearing connecting said shafts, a cam carried by said second shaft, and means connecting said carrier and said cam whereby a rotation of said second shaft produces an oscillation of said carrier.

13. In a bag-machine, the combination with a blank-support turning about an axis and having tuck-holders, of a blank-folding member having box-holders and a defining edge, a carrier mounted for oscillation on an axis substantially coincident with that of the blank-carrier and supporting the blank-folding member for oscillating movement thereon, means for oscillating said carrier on its axis, a stationary cam, and means intermediate the cam and the folding member for oscillating the folding member on the carrier.

14. In a bag-machine, mechanism for forming diamond folds on a bellows-sided bag-blank, including in combination a movable blank-support having tuck-holders, carrier-arms mounted for oscillation, means for engaging and turning back the upper ply of the blank about the primary transverse crease-line, said means including a blank-folding member mounted for oscillation on said arms about an axis laterally displaced from the plane of the member, means for oscillating said arms through a path such that said axis is maintained at an approximately constant distance from said support during the folding operation, and means for oscillating said blank-folding member relative to said arms through an arc such that the portion of the member adapted to engage the blank nearest said transverse crease-line approaches said blank-support during the folding operation.

15. In a bag-machine, mechanism for forming diamond folds on bellows-sided blanks, including in combination a rotary blank-support, carrier-arms mounted to swing about an axis substantially coincident with the axis of rotation of the blank-support, means for swinging said arms on their axis, folding mechanism moved by said arms, including a folding member mounted for oscillation on said arms, and means including toothed gearing for oscillating said blank-folding member on said arms as it is carried forward and back by the arms.

16. In a bag-machine, mechanism for forming diamond folds on bellows-sided blanks, having in combination a blank-support rotating about an axis, carrier-arms mounted to swing about an axis substantially coincident with the first-mentioned axis, means for swinging said arms about their axis, coactive folding mechanism moved by said arms including a folding member pivoted to said arms, and means for swinging said member relatively to said arms including a toothed gear and sector carried with and by the said arms, and a cam for operating said sector.

17. In a bag-machine, mechanism for forming diamond folds on bellows-sided blanks including in combination a blank-support having a blank-engaging surface generally cylindrical but provided with a tangential extension for supporting the lower ply of the flap end of the blank, a front diamond-holder mounted on the carrier for holding the flap end of the blank against the tangential extension, and means coöperating with the blank-support to engage and turn back the upper ply of the blank to form the diamond folds.

18. In a bag-machine, a cylindrically-curved support for the body portion of a bag-blank, means engaging the under surface of the flap end of the under ply of the blank to hold it above said support, a gripper for holding said flap end against said engaging means, and means coöperating with said support and the flap engaging and holding means to engage and turn back the upper ply of the bag-blank.

19. In a bag-machine, a pivoted support for the body of the blank having its surface engaged by said body cylindrical about the pivotal axis of the blank-support, means for turning said support about its pivotal axis, means for engaging the flap end of the lower ply of the blank and positively holding it in a position outside of, and substantially tangential to the path of travel of said surface, and mechanism coöperating with said blank-carrier to engage and turn back the upper ply of the blank to form diamond folds thereon.

20. In a bag-machine, a rotating blank-support having a folding-bed, means for securing the lower plies of successive blanks on the support, a carrier pivoted on an axis in substantial alinement with the axis of rotation of the blank-support, means for moving said carrier in the same direction as the folding-bed during the folding operation on one blank and then in a reverse direction to coöperative relation with a succeeding blank, folding devices carried by and moving with the carrier for engaging the upper ply of the blank and folding it back to form the diamond, and means including a sector-gear for oscillating the folding devices relative to the carrier.

21. In a bag-machine, mechanism for forming diamond folds on bellows-sided blanks, including in combination a rotary folding-bed, carriers, means for oscillating them about a center of rotation within the rotary path of the bed, folding mechanism pivotally supported on said carriers, gear-wheels secured to said folding mechanism concentrically with the pivotal axis of said mechanism, levers pivoted on the carriers having racks which engage said gears, and cams arranged to engage and actuate said levers and racks and through them the folding mechanism as the carriers are oscillated.

22. In a bag-machine, a blank-carrier, pivoted to turn about an axis and provided with a cylindrical supporting-surface for the body of the blank, means for turning said carrier about its axis, means for securing the body of the blank against said surface, means for engaging the under surface of the flap end of the under ply of the blank at a position above said surface, and means for engaging and turning back the upper ply of the blank to form the diamond folds thereon.

23. The combination with a movable blank-carrier having tuck-holders and with an oscillatory blank-holding member having a defining edge and box-holders, of supporting means pivotally supporting said member at a point remote from said edge, a cam-operated rack for operating said member in its support and a cam for advancing said supporting means with the blank-carrier during the diamond-forming operation.

24. In a bag-machine, mechanism for forming diamond folds on bellows-sided blanks including in combination a blank-support mounted for rotation about a fixed axis, carriers, means for oscillating them, folding mechanism mounted on said carriers and moved by them through an oscillatory path above and in the general direction of the rotary path of the blank-support, said mechanism including a folding member mounted to move relatively to the carriers about an axis and having a defining edge situated at a distance from said last-named axis approximately equal to, but slightly less than the distance between said axis and the rotary path of the blank-support, whereby the said defining edge swings back and forth clear of the said rotary path.

25. In a bag-machine, mechanism for forming diamond folds on bellows-sided blanks, including in combination a rotating blank-support constituting a folding-bed, means for holding the lower ply of successive blanks thereon, a guiding and supporting carrier pivotally mounted on an axis within the circle of rotation of the blank-carrier, means for oscillating said carrier on said axis to move said carrier in the same direction as the folding-bed during the formation of the diamond and thereafter in a reverse direction to coöperative relation with a succeeding blank, blank-folding devices carried by and moving with the oscillating carrier for engaging the upper ply of the blank and folding it back to form the diamond, and means including a cam-operated sector for oscillating said folding devices on said carrier.

26. In a bag-machine, mechanism for forming diamond folds on bellows-sided blanks, including in combination a rotary blank-support constituting a folding-bed, a supporting and guiding carrier pivotally mounted on an axis mounted within the circle of rotation of the blank-support, means for moving said carrier about its axis in the same direction as the folding-bed during the formation of the diamond and thereafter in a reverse direction to coöperative relation with a succeeding blank, a folding device carried by and moving with the carrier for engaging the upper ply of a blank and folding it back to form the diamond, and a sector-gear pivoted eccentrically to the blank-carrier axis for oscillating the folding device on its carrier.

27. In a bag-machine, mechanism for forming diamond folds on bellows-sided blanks, including in combination a rotating blank-support constituting a folding-bed, means for holding the lower plies of successive blanks thereon, an oscillating blank-folding plate, box-holders coöperating with said plate, an arm pivotally supporting said plate and mounted for oscillation on an axis located in concentric relation to the circle of rotation of the blank-support, means including a sector-gear for oscillating the folding-plate on the arm and means for oscillating the arm to move the pivot of the folding-plate forward relative to the direction of movement of the blank-support during the blank-folding operation.

28. In a bag-machine, a rotating blank-support constituting a folding-bed, means for holding the lower plies of successive blanks thereon, a folding plate-carrier having a fixed pivot-axis located within the circle of rotation of the blank-support, a blank-folding plate mounted for oscillation on said carrier, means for holding the upper ply of the blank to be folded against said folding-plate, means including a cam-operating sector for oscillating the folding-plate on its carrier and means for oscillating the folding-plate carrier.

29. In a bag-machine, a rotating blank-support constituting a folding-bed, means for holding the lower plies of successive blanks thereon, a folding-plate carrier having a fixed pivot-axis located within the circle of rotation of the blank-carrier, a blank-folding plate mounted for oscillation on said carrier, means for holding the upper ply of the blank to be folded against said folding-plate, a sector eccentrically pivoted relative to the blank-carrier axis for oscillating the folding-plate on the carrier, and means for oscillating the folding-plate carrier.

30. In a bag-machine, mechanism for forming diamond folds on bellows-sided blanks including in combination a shaft, a blank-support secured thereon, a pair of carrier-arms mounted to swing about said shaft and located one at each end of said rotary blank-support, means for rotating said shaft, means for swinging said arms, blank-folding mechanism pivotally supported by said arms, and means for oscillating said mechanism relatively to said arms comprising cams mounted on said shaft, gears carried by said folding mechanism, and a connection between said cams and said gears.

31. In a bag-machine, mechanism for forming diamond folds on bellows-sided blanks including in combination a rotating shaft, a rotating blank-support secured on the shaft, a carrier journaled about said shaft, means for rotating said shaft, means for swinging said carrier, folding mechanism pivotally connected to said carrier, and means for oscillating it relatively to the carrier as the latter is oscillated, comprising a stationary cam mounted on and positioned by the shaft, a gear secured to the folding mechanism and a lever mounted on the carrier, engaging the cam, and provided with gear-teeth engaging said gear-wheel.

32. In a bag-machine, mechanism for forming diamond folds on bellows-sided blanks including in combination a rotating shaft, a rotating blank-support secured on the shaft, a carrier journaled about said shaft, means for rotating said shaft, means for swinging said carrier, folding mechanism pivotally connected to said carrier, and means for oscillating it relatively to the carrier as the latter is oscillated, comprising a stationary cam, a gear secured to the folding mechanism, and a lever mounted on the carrier, engaging the cam, and provided with gear-teeth engaging said gear-wheel.

WILLIAM A. LORENZ.

Witnesses:
  CHAS. F. SCHMELZ,
  NELLIE PHOENIX.